(12) United States Patent
Puranen et al.

(10) Patent No.: US 10,823,704 B2
(45) Date of Patent: Nov. 3, 2020

(54) INSPECTING CONDITION OF LOAD BEARING MEMBER

(71) Applicant: KONE Corporation, Helsinki (FI)

(72) Inventors: Mikko Puranen, Helsinki (FI); Hannu Lehtinen, Helsinki (FI)

(73) Assignee: KONE CORPORATION, Helsinki (FI)

(*) Notice: Subject to any disclaimer, the term of this patent is extended or adjusted under 35 U.S.C. 154(b) by 213 days.

(21) Appl. No.: 16/025,211

(22) Filed: Jul. 2, 2018

(65) Prior Publication Data
US 2018/0306752 A1 Oct. 25, 2018

Related U.S. Application Data

(63) Continuation of application No. PCT/EP2017/054483, filed on Feb. 27, 2017.

(30) Foreign Application Priority Data

Feb. 29, 2016 (EP) .................................... 16157806

(51) Int. Cl.
| | |
|---|---|
| *G01N 29/04* | (2006.01) |
| *G01N 29/06* | (2006.01) |
| *B66B 7/12* | (2006.01) |
| *G01N 29/26* | (2006.01) |
| *B66B 7/06* | (2006.01) |

(52) U.S. Cl.
CPC ......... *G01N 29/043* (2013.01); *B66B 7/1215* (2013.01); *G01N 29/0654* (2013.01);
(Continued)

(58) Field of Classification Search
CPC .................. B66B 7/062; B66B 7/1215; G01N 2291/02827; G01N 2291/044;
(Continued)

(56) References Cited

U.S. PATENT DOCUMENTS

| | | | |
|---|---|---|---|
| 2003/0037615 A1* | 2/2003 | Madaras ................ | G01N 29/11 73/598 |
| 2011/0166807 A1 | 7/2011 | Kitazawa et al. | |

(Continued)

FOREIGN PATENT DOCUMENTS

| | | |
|---|---|---|
| EP | 2 799 217 A1 | 11/2014 |
| WO | WO 2005/040028 A1 | 5/2005 |
| WO | WO 2010/129701 A2 | 11/2010 |

OTHER PUBLICATIONS

International Search Report (PCT/ISA/210) issued in PCT/EP2017/054483, dated Apr. 20, 2017.
(Continued)

*Primary Examiner* — Francis C Gray
(74) *Attorney, Agent, or Firm* — Birch, Stewart, Kolasch & Birch, LLP

(57) ABSTRACT

A method for inspecting a condition of an elongated load bearing member of a rope of a hoisting apparatus, such as an elevator includes ultrasound scanning one or more regions of the load bearing member with an ultrasonic scanner. A method for inspecting a condition of a rope of a hoisting apparatus, such as an elevator, which rope includes at least one load bearing member includes inspecting at least one load bearing member of the rope with an ultrasound scanner.

18 Claims, 4 Drawing Sheets

(52) U.S. Cl.
CPC ............ *G01N 29/262* (2013.01); *B66B 7/062* (2013.01); *G01N 2291/02827* (2013.01); *G01N 2291/044* (2013.01); *G01N 2291/269* (2013.01)

(58) Field of Classification Search
CPC ........... G01N 2291/269; G01N 29/043; G01N 29/0654; G01N 29/262
See application file for complete search history.

(56) References Cited

U.S. PATENT DOCUMENTS

| | | | |
|---|---|---|---|
| 2012/0053852 A1* | 3/2012 | Padilla ............... | G01N 29/4445 702/34 |
| 2013/0104659 A1* | 5/2013 | Parker ................ | G01N 29/043 73/627 |
| 2014/0102202 A1* | 4/2014 | Shibata ................ | G01N 29/04 73/596 |
| 2017/0030871 A1* | 2/2017 | Lobkis ................ | F01D 17/085 |
| 2017/0045493 A1* | 2/2017 | van der Woude ....... | B66D 1/54 |
| 2018/0059063 A1* | 3/2018 | Laguerre ............... | G01N 29/07 |

OTHER PUBLICATIONS

Kwun et al., "Feasibility of nondestructive evaluation of synthetic or wire ropes using a transverse-impulse vibrational wave," NDT International vol. 21 No. 5 Oct. 1988, pp. 341-343.
Written Opinion of the International Searching Authority (PCT/ISA/237) issued in PCT/EP2017/054483, dated Apr. 20, 2017.

\* cited by examiner

INSPECTING CONDITION OF LOAD BEARING MEMBER

CROSS REFERENCE TO RELATED APPLICATIONS

This application is a Continuation of PCT International Application No. PCT/EP2017/054483, filed on Feb. 27, 2017, which claims priority under 35 U.S.C. 119(a) to patent application Ser. No. 16/157,806.7, filed in Europe on Feb. 29, 2016, all of which are hereby expressly incorporated by reference into the present application.

FIELD OF THE INVENTION

The invention relates to inspecting condition of an elongated load bearing member of a rope of a hoisting apparatus. The hoisting apparatus is preferably an elevator for vertically transporting passengers and/or goods.

BACKGROUND OF THE INVENTION

In hoisting devices such as elevators, one or more ropes are used as the means by which the load to be hoisted is suspended. Ropes of an elevator are normally either round in cross section or belt-shaped. Each elevator rope typically includes one or more load bearing members that are elongated in the longitudinal direction of the rope, each forming a structure that continues unbroken throughout the length of the rope. Load bearing members are the members of the rope which are able to bear together the load exerted on the rope in its longitudinal direction. The load, such as a weight suspended by the rope, causes tension on the load bearing member, which tension can be transmitted by the load bearing member in question all the way from one end of the rope to the other end of the rope. Ropes may further comprise non-bearing components, such as a coating, which cannot transmit tension in the above described way. The coating can be utilized for protection of the load bearing members and/or facilitating contact with rope wheels and/or for positioning adjacent load bearing members relative to each other, for example. The coating can be made of polymer material. The load bearing members are typically made of twisted steel wire cords but they can be also made of twisted aramid cords or composite material wherein the fibers are embedded in a polymer matrix.

In prior art, the condition of the load bearing members has been inspected by monitoring electrical properties of the load bearing members, such as the resistance of a circuit formed partially by the load bearing members or the resistance of a circuit formed partially by conductor wires embedded inside the load bearing members. This kind of inspection has the drawback that it does not reliably reveal all kinds of damages in all kinds of ropes.

It has been now found out that prior art inspection methods, such as those monitoring electric properties, do not reliably reveal all kinds of damages in all kinds of ropes. Particularly, it has been found out that delamination of a load bearing member, when it is made of composite material, may not be always be revealed in this type of inspection method. It has been concluded that delamination does not affect all the properties of the rope such that the damage can be early noticed. For instance resistance may not be considerably changed due to delamination.

BRIEF DESCRIPTION OF THE INVENTION

The object of the invention is to introduce an improved method for inspecting condition of an elongated load bearing member of a rope of a hoisting apparatus, such as an elevator, as well as a method for inspecting condition of a rope of a hoisting apparatus, such as an elevator. An object is to introduce a solution by which one or more of the above defined problems of prior art and/or problems discussed or implied elsewhere in the description can be solved. An object is particularly to introduce a solution by which flaws or damages inside a load bearing member of a rope can be detected, localized and reacted to. Embodiments are presented, inter alia, by which flaws or damages particularly inside a fiber reinforced composite load bearing member of a rope can be effectively be detected, localized and reacted to. Embodiments are presented, inter alia, by which particularly delamination of internal structures of a fiber reinforced composite load bearing member can be effectively be detected, localized and reacted to.

It is brought forward a new method for inspecting condition of an elongated load bearing member of a rope. The method comprises ultrasound scanning one or more regions of the load bearing member of a rope with an ultrasonic scanner. With this solution one or more of the above mentioned objects can be achieved. Preferable further details are introduced in the following, which further details can be combined with the method individually or in any combination.

In a preferred embodiment, in said ultrasound scanning plurality of regions of the load bearing member located along the length thereof are ultrasound scanned. Thus, damages or flaws of the load bearing member can be found. Preferably, the whole length of the load bearing member is inspected in this way.

In a preferred embodiment, said ultrasound scanning is performed from a lateral side of the load bearing member.

In a preferred embodiment, the method comprises moving said ultrasonic scanner and said load bearing member relative to each other such that the scanner lies at least momentarily beside each region to be scanned at a distance which is within the scanning range of the scanner. Said scanning range can be less than 10 cm for instance. Preferably, in said moving said ultrasonic scanner and said load bearing member are moved relative to each other such that the ultrasonic scanner moves along said load bearing member passing by said plurality of regions. Then, in said moving the load bearing member is preferably continuously maintained within scanning range of the scanner. In general, the scanning can be performed continuously or intermittently. When the scanning is performed intermittently, the method preferably comprises stopping said relative movement intermittently to perform a scanning. When the scanning is performed continuously, said scanning is performed without stopping said relative movement.

In a preferred embodiment, said ultrasound scanning comprises emitting ultrasound from a lateral side of the load bearing member into the load bearing member and receiving echoes of the ultrasound emitted into said load bearing member.

In a preferred embodiment, said ultrasound scanning comprises creating from each said region a cross sectional view of the load bearing member based on echoes received from the load bearing member. The method then preferably further comprises analyzing the cross sectional view(s) created. Said cross-sectional views are preferably 2D views, presenting a cross sectional view of the load bearing member in longitudinal direction of the load bearing member.

In a preferred embodiment, the method comprises detecting echoes from within the load bearing member, and triggering one or more predefined actions if echoes are detected from within the load bearing member that fulfill one or more predetermined criteria, such as exceed a predetermined threshold and/or form a predetermined shape. The detecting can be comprised in the analyzing mentioned in the previous paragraph, for instance. Said predetermined shape is preferably elongated and substantially linear.

In a preferred embodiment, the detecting echoes from within the load bearing member mentioned in the previous paragraph is performed by a data processing device, such as a computer, that is either integral with the scanner or connected thereto via a data exchange bus. In this case, the detection does not necessitate detection from the cross sectional views. Said one or more predefined actions can also be triggered by the data processing device. Then, said one or more predefined actions preferably include an alarm.

Preferably echoes from within the load bearing member are detected either from raw data produced by the scanning or from cross sectional views produced by the scanning. When a computer is involved with said detection, said one or more predefined actions preferably include an alarm. Thus, an operator can check the spot more carefully by himself and draw final conclusions. Thus the inspection can be implemented in a semi-automatic fashion.

In a preferred embodiment, the aforementioned echoes from within the load bearing member being detected, as mentioned anywhere above, are particularly echoes from core portion of the load bearing member, the core portion being the centermost third of the cross-sectional area of the load bearing member, as measured in direction of said scanning, i.e. in cross-direction of the load bearing member. This portion is most relevant for detection of damages or flaws of the region that are in the form of internal delamination of the load bearing member. This is advantageous particularly when the load bearing member is made of composite material comprising reinforcing fibers embedded in polymer matrix, because this type of load bearing members are sensitive to delamination of the core.

In a preferred embodiment, the method, e.g. the aforementioned analyzing said cross sectional view, can comprise additionally or alternatively detecting deviations between cross-sectional views from different regions or deviations between raw data produced from different regions by the scanner. Then, preferably said detecting deviations comprises comparing cross-sectional views from different regions or comparing raw data produced from different regions by the scanner, with each other. This comparing can be performed by a computer or equivalent data processing device.

In a preferred embodiment, said ultrasound scanning comprises creating from each said region an echo strength graph based on echoes received from the load bearing member, the echo strength graph presenting echo strength versus thickness directional position of the load bearing member. The method then preferably further comprises analyzing the echo strength graph(s) created. An advantage of creation of an echo strength graph is that it allows use of a simple ultrasound scanning principles and equipment, yet the graph enables simple and quick analysis to detect abnormalities in the echoes registered from the load bearing member being inspected. Creation of an echo strength graph provides a simple alternative to the above described creation of a cross-sectional view, but these two can also be used in parallel, if desired. The echo strength graph preferably presents echo strength versus thickness directional position of the load bearing member as a curve, a line graph, a histogram, a bar chart, or equivalent. The graph is preferably created in a coordinate system, such as a Cartesian coordinate system for example, one axis presenting the echo strength and another axis presenting a thickness directional position of the load bearing member.

In a preferred embodiment, the analysis of the echo strength graph comprises detecting amplitudes of one or more peaks of the graph and comparing the amplitudes of one or more peaks of the graph with one or more references, and triggering one or more predefined actions if the amplitudes of one or more peaks of the graph meet one or more predetermined criteria.

In a preferred embodiment, the load bearing member is made of composite material comprising reinforcing fibers embedded in polymer matrix, said reinforcing fibers preferably being carbon fibers or glass fibers. With this type of load bearing members, the condition monitoring by ultrasound is particularly advantageous, because they are fragile and sensitive to formation of internal flaws or damages that are otherwise difficult to notice and localize. The load bearing member is preferably completely non-metallic, i.e. made not to comprise metal.

In a preferred embodiment, the load bearing member is inspected either naked of additional rope components, such as other load bearing members or substantial amount of coating. In a second kind of preferred embodiment, the load bearing member is inspected while it has additional rope components attached thereto, said additional rope components including one or more load bearing members and/or a coating. Then preferably said load bearing member is comprised in a rope and extends parallel with the longitudinal direction of the rope unbroken throughout the length of the rope. If the load bearing member is comprised in a rope comprising plurality of load bearing members embedded in a coating, the plurality of load bearing members can all be scanned simultaneously in the manner described. The coating is preferably made of polymer material.

In a preferred embodiment, the load bearing member is comprised in a rope and embedded in a coating forming the outer surface of the rope and said ultrasound scanning is performed through the coating. The coating is preferably made of polymer material.

In a preferred embodiment, the rope is a suspension rope of an elevator for suspending an elevator car.

In a preferred embodiment, the load bearing member is comprised in a rope which is connected to the elevator car and suspends the elevator car. Thus, the inspection can be performed without removing or dismantling of components of an installed elevator system. In this case, the scanner is preferably mounted in a fixed location at least for the time of the method, and the aforementioned relative movement is produced by driving the elevator car, most preferably at a speed slower than the nominal speed of the elevator, e.g. with a speed slower than 2 m/s. It is further preferable that the detecting echoes from within the load bearing member mentioned earlier above is performed by a data processing device, such as a computer, that is either integral with the scanner or connected thereto via a data exchange bus. Also said one or more predefined actions can be triggered by the data processing device, said one or more predefined actions then preferably including an alarm.

In a preferred embodiment, the rope is belt shaped and larger in its width direction than in its thickness direction. Then, the scanner is preferably positioned opposite a wide side face of the rope that faces in thickness direction of the rope. The scanning is performed particularly from a lateral side of the load bearing member in thickness direction of the rope. Accordingly, the ultrasound is emitted into the load bearing member(s) through a wide side face of the rope that faces in thickness direction of the rope. As mentioned, the method e.g. said analyzing preferably comprises detecting echoes from within the load bearing member, and triggering one or more predefined actions if echoes are detected from within the load bearing member that fulfill one or more predetermined criteria, such as exceed a predetermined threshold and/or form a predetermined shape. The rope being belt-shaped said one or more predetermined criteria preferably include that the echoes detected from within the load bearing member form an elongated and substantially linear shape extending in width direction of the rope.

In a preferred embodiment, said ultrasound scanner is a phased array ultrasound scanner said ultrasound scanning being phased array ultrasound scanning.

It is also brought forward a new method for inspecting condition of a rope, which rope comprises at least one load bearing member, the method comprising inspecting at least one load bearing member of the rope with the method described anywhere above or elsewhere in the application such as in any of the claims. With this solution one or more of the above mentioned objects can be achieved.

The elevator is preferably such that the car thereof is configured to serve two or more vertically displaced landings. The elevator is preferably configured to control movement of the car in response to signals from user interfaces located at landings) and/or inside the car so as to serve persons on the landing(s) and/or inside the elevator car. Preferably, the car has an interior space suitable for receiving a passenger or passengers, and the car can be provided with a door for forming a closed interior space.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
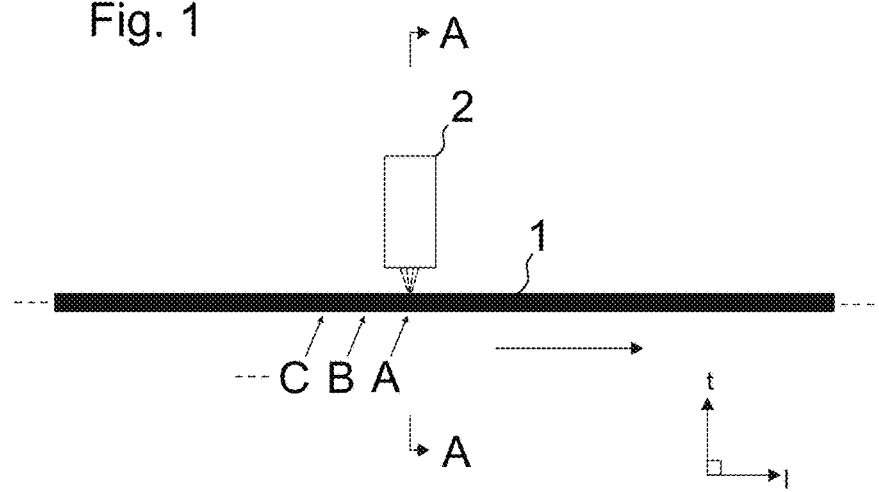
FIG. 1 illustrates a first kind of embodiment of a method for inspecting condition of an elongated load bearing member.
Figure 2:
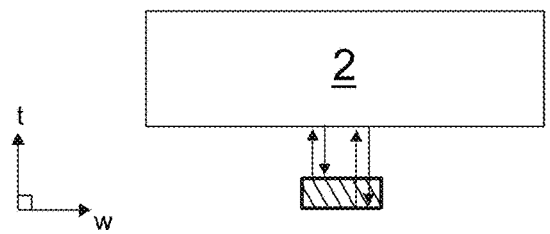
FIG. 2 illustrates a cross sectional view A-A of FIG. 1.

FIGS. 1 and 2 illustrate a first kind of embodiment of a method for inspecting condition of an elongated load bearing member 1 of a rope, wherein the load bearing member 1 is inspected naked of additional rope components, such as other load bearing members or substantial amount of coating.

Figure 3:
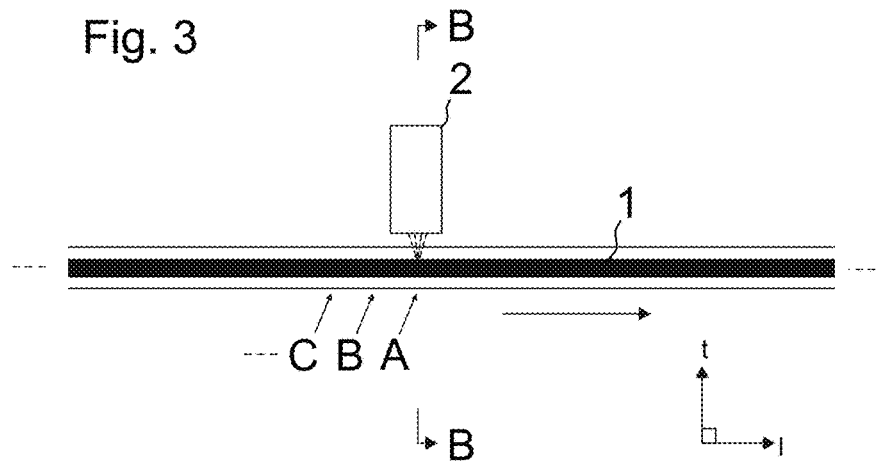
FIG. 3 illustrates a first kind of embodiment of a method for inspecting condition of an elongated load bearing member.
Figure 4:
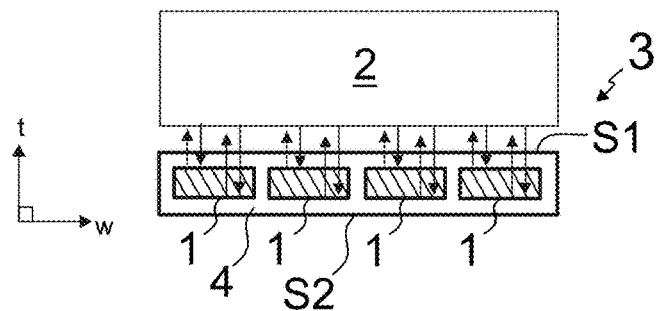
FIG. 4 illustrates a cross sectional view B-B of FIG. 3.

FIGS. 3 and 4 illustrate a first kind of embodiment of a method for inspecting condition of an elongated load bearing member 1 of a rope 3, wherein the load bearing member 1 already forms a part of a larger entity, i.e. a rope 3, and thereby has additional rope components attached thereto.

In both embodiments, in the method regions A,B,C of the load bearing member 1 of a rope are scanned with an ultrasonic scanner 2 from a lateral side of the load bearing member 1. In these embodiments, there are plurality of regions A,B,C of the load bearing member 1 located distributed along the length thereof that are ultrasound scanned. Said ultrasound scanning comprises emitting ultrasound from a lateral side of the load bearing member 1 into said load bearing member 1, in particular into the region being scanned, and receiving echoes E,E' of the ultrasound emitted into said load bearing member. For the purpose of emitting ultrasound from a lateral side of the load bearing member 1 into said load bearing member 1, the scanner 2 is positioned on a lateral side of the load bearing member 1.

The method further comprises detecting echoes E' from within the load bearing member 1, and triggering one or more predefined actions if echoes E' are detected from within the load bearing member that fulfill predetermined criteria, such as exceed a predetermined threshold and/or form a predetermined shape. A substantial amount of echoes E' from within the load bearing member indicates that the load bearing member 1 in question has internal damage or flaws, such as fractures. If the echoes E' are elongated and linear in shape, this means that internal delamination is likely to exist. Said echoes E' from within the load bearing member to be detected are preferably particularly echoes from the core portion of the load bearing member 1, wherein the core portion is the centermost third of the cross-sectional area, as measured in direction of said scanning, i.e. in cross-direction of the load bearing member 1. Echoes E,E' can be detected by a computer or equivalent data processing device from raw data produced by the scanning but alternatively by a person or by a computer or equivalent data processing device from cross sectional views V produced by the scanner 2.

When said detecting echoes E' from within the load bearing member 1 is performed by a data processing device, such as a computer, that is either integral with the scanner 2 or connected thereto via a data exchange bus, said one or more predefined actions are also triggered by the data processing device. The data processing device is to be provided with data processing program or software, whereby it can execute the tasks set for the processing device. Said one or more predefined actions preferably include an alarm. Thus an operator can be alarmed to check the spot more carefully. Thus the inspection can be implemented as semi-automatic. The checking by the operator is preferably performed by analyzing a cross sectional view V created from the region where the echoes E' causing alarm were detected.

For enabling scanning of plurality of regions A,B,C of the load bearing member 1, the method comprises moving said ultrasonic scanner 2 and said load bearing member 1 relative to each other. This is performed in particular such that the scanner lies at least momentarily beside each region A,B,C to be scanned at a distance which is within the scanning range of the scanner 2, i.e. in a position which is on a lateral side of the load bearing member. In the preferred embodiment, said ultrasonic scanner 2 and said load bearing member 1 are moved relative to each other particularly such that the ultrasonic scanner moves along said load bearing member 1 passing by said plurality of regions A,B,C. In said moving the load bearing member 1 is continuously maintained within scanning range of the scanner 2. Each of these facilitate that a big number of successive locations of the load bearing member 1 can be ultrasound scanned simply. Preferably, the whole length of the load bearing member 1 is inspected in this way. Said scanning range is with regular scanners less than 10 cm.

The scanning can be performed in each embodiment either continuously or intermittently. In case the scanning is performed intermittently, the method comprises stopping said relative movement intermittently to perform a scanning. In case the scanning is performed continuously said relative movement is continuous, and said scanning is performed without stopping said movement.

As mentioned, in the first embodiment presented in FIGS. 1 and 2, the load bearing member 1 is inspected while it is naked of additional rope components, such as other load bearing members or substantial amount of coating. In the embodiment of FIGS. 1 and 2 the load bearing member 1 can later, i.e. after said inspection be attached to additional rope components, such as other load bearing members or substantial amount of coating. Thus, the embodiment of FIGS. 1 and 2 suits well to form an inspection step of a method for manufacturing a rope, because this enables inspection of each load bearing member 1 individually before attaching it to other components of the rope that is being manufactured. However, it is also possible that the load bearing member 1 alone forms a rope without additional components, such as other load bearing members or substantial amount of coating. In this case, the inspection is suitable for being performed as part of manufacturing phase or as part of inspection during installation or condition monitoring of a used rope.

As mentioned, in the second embodiment presented in FIGS. 3 and 4, the load bearing member is inspected while it has additional rope components attached thereto, such as other load bearing members 1 and/or substantial amount of coating 4. As presented in FIG. 4, the load bearing member 1 is comprised in a rope 3 comprising plurality of load bearing members 1 embedded in a coating 4 forming the outer surface of the rope 3. Said ultrasound scanning is performed through the coating 4. The method provides that the load bearing member 1 can be inspected without breaking any components and even without having any access to the load bearing member 1 due to the coating 4. The coating 4 is preferably made of polymer material. The coating 4 can be intended for protection of the load bearing members and/or facilitating contact with rope wheels and/or for positioning adjacent load bearing members relative to each other, for example. The coating 4 is preferably made of polymer material. It is furthermore preferably elastic, for which purpose the material is preferably elastomer, such as polyurethane or silicon or rubber. The rope 3 is furthermore such that the aforementioned load bearing member 1 or a plurality of load bearing members 1, comprised in the rope 3, together cover majority, preferably 70% or over, more preferably 75% or over, most preferably 80% or over, most preferably 85% or over, of the width of the cross-section of the rope 3 for essentially the whole length of the rope 3. Thus the supporting capacity of the rope 3 with respect to its total lateral dimensions is good, and the rope 3 does not need to be formed to be thick. In the illustrated embodiments, the load bearing members 1 are substantially rectangular and larger in width direction than thickness direction. However, this is not necessary as alternative shapes could be used. Likewise, it is not necessary that the number of the load bearing members is four which is used for the purpose of the example. The rope 3 may of course be modified to have some other number of said load bearing members 1, such as 1, 2, 3, 5 or six or more. In the presented case, wherein there are plurality of load bearing members 1 comprised in the rope 3, these are preferably all scanned simultaneously in the manner described. Also the coating 4 can be inspected together with the load bearing member 1 in the manner described.

Figure 5:
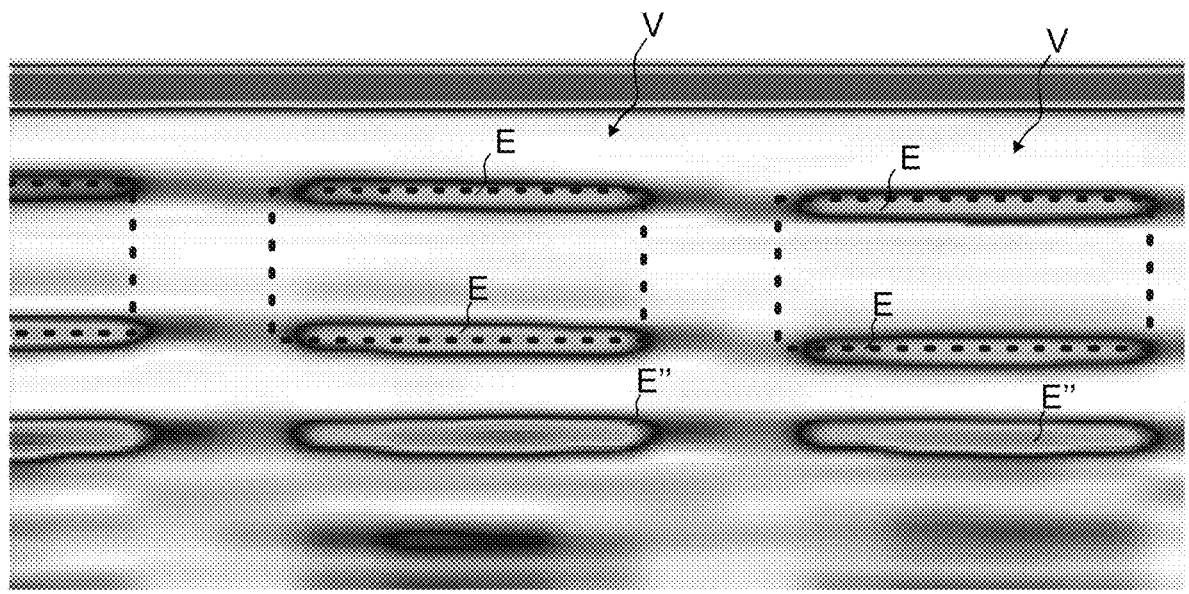
FIG. 5 illustrates an example of a cross sectional view created by an ultrasound scanner of an intact load bearing member.
Figure 6:
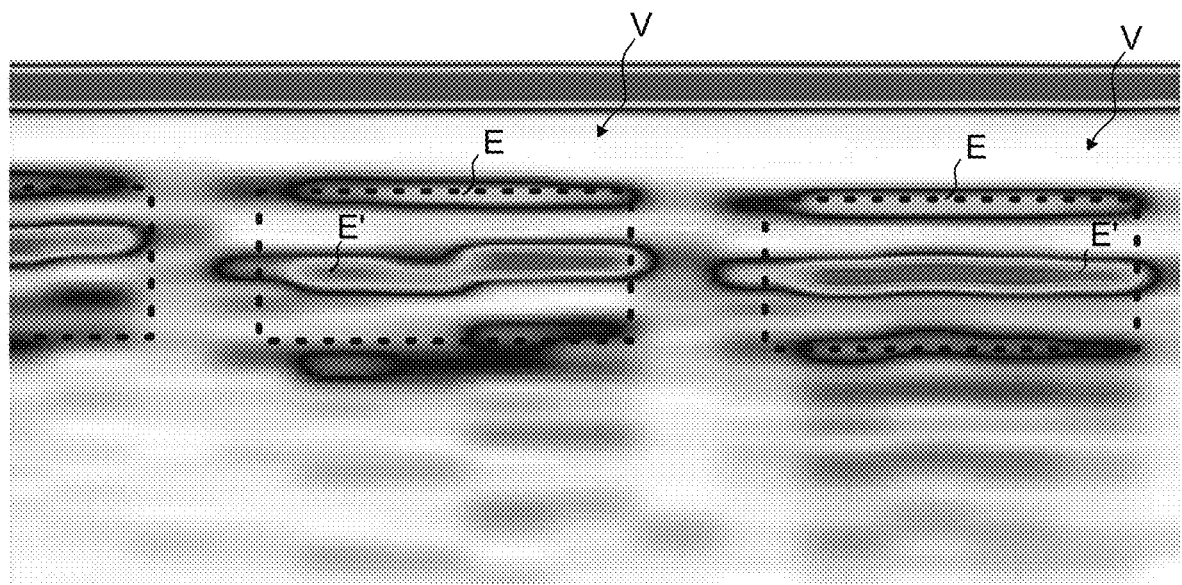
FIG. 6 illustrates an example of a cross sectional view created by an ultrasound scanner of a load bearing member containing a delamination fracture.

Preferably, said ultrasound scanning comprises creating from each region A,B,C a cross sectional view V of said load bearing member 1 based on echoes received from the load bearing member 1. A cross sectional view V of said load bearing member 1 from a region A,B,C is created based on echoes received from that region A,B,C of the load bearing member 1. The region can be a slice of the load bearing member very short in longitudinal direction of the load bearing member 1, but it can also have some length in longitudinal direction of the load bearing member 1 if this is preferable e.g. for obtaining an average result of a short section of the load bearing member. The creation of the cross sectional view is performed by a computer or equivalent, which computer or equivalent is either integral with the scanner or connected thereto via a data exchange bus. FIGS. 5 and 6 illustrate examples of cross sectional views V created by the ultrasound scanner 2. The method further comprises analyzing the cross sectional views V created. In general, the analyzing can be analyzing for detecting predetermined characteristics in individual cross sectional views V or in group of cross sectional views V or it can be comparison of cross sectional views V from different regions A,B,C with each other for detecting deviations between them. Preferred details of the analysis will be described later in the application.

In FIGS. 5 and 6, broken line rectangles have been added using image processing software to indicate the position of the load bearing members 1. In these exemplary Figures, the cross sectional view V is created of a load bearing member 1 but additionally also of further load bearing members 1 as well as a coating. The cross sectional view V is thus particularly in line with the embodiment of FIGS. 3 and 4. In case of embodiment of FIGS. 1 and 2, the cross sectional view V would cover only the load bearing member 1 naked of components attached thereto.

In FIG. 5, echoes E received from an intact load bearing member 1 are visible. The echoes E include substantial amounts of echoes E reflected from the outer surfaces of the load bearing member 1 facing the scanner 2. In the Figure additionally echoes E" are visible which have been reflected from the back surface of the rope 3. No substantial amount of echoes have been received from the centermost third of the cross-sectional area of the load bearing member 1, as measured in direction of said scanning, i.e. in cross-direction of the load bearing member 1. In FIG. 6, echoes E from a damaged or a flawed load bearing member 1 are visible. The echoes E include substantial amounts of echoes E reflected from the outer surfaces of the load bearing member 1 facing the scanner. In the Figure additionally echoes E' are visible which have been reflected from within the load bearing member 1. These echoes E' include substantial amount of echoes received from the centermost third of the cross-sectional area of the load bearing member 1, as measured in direction of said scanning, i.e. in cross-direction of the load bearing member 1. This can be interpreted to mean that the load bearing member 1 has at the region under analysis internal damage, such as cracks. In this case, the echoes can be elongated and linear in shape, which means that the damages or flaws of the region are likely in the form of internal delamination of the load bearing member 1.

In order to identify damages or flaws of the load bearing member, it is preferable that the method comprises detecting echoes E' from within the load bearing member 1, and triggering one or more predefined actions if echoes are detected from within the load bearing member 1 that fulfill predetermined criteria, such as exceed a predetermined threshold and/or form a predetermined shape. Said predetermined threshold can be for example a threshold of amplitude of the echoes. Said predetermined shape is preferably an elongated and substantially linear shape. Echoes E' forming such a shape has been illustrated in FIG. 6. Said echoes can be detected from said cross sectional views V as part of the analysis thereof but alternatively said echoes can be detected from raw data produced by the scanning by a computer or equivalent data processing device. Said echoes E' from within the load bearing member 1 being detected are preferably particularly echoes from the core portion of the load bearing member 1, the core portion being the centermost third of the cross-sectional area of the load bearing member 1, as measured in direction of said scanning, i.e. in cross-direction of the load bearing member 1.

As illustrated in FIGS. 5 and 6, said cross-sectional views V are preferably 2D views, presenting a cross sectional view of the load bearing member 1 in longitudinal direction of the load bearing member 1.

The method can comprise additionally or alternatively detecting deviations between cross-sectional views from different regions A,B,C or deviations between raw data produced from different regions A,B,C by the scanner. Then, preferably said detecting deviations comprises comparing cross-sectional views V from different regions A,B,C as part of said analyzing said cross sectional views V or comparing raw data produced from different regions A,B,C by the scanner 2, with each other. This comparing can be performed by a computer or equivalent data processing device.

Preferably, said ultrasound scanner 2 is a phased array ultrasound scanner. In this case, said ultrasound scanning is phased array ultrasound scanning. Phased array ultrasonic can use multiple ultrasonic transducers, each of which can be pulsed independently. By varying the timing, for instance by pulsing the elements one by one in sequence along a row, a pattern of constructive interference is set up that results in a beam at a set angle. In other words, the beam can be steered electronically. Then, data from multiple beams can be put together to make a cross-sectional view in the form of an image showing a slice through the load bearing member 1 and possibly also through the additional components attached thereto.

As mentioned, said ultrasound scanning can comprise creating from each region A,B,C a cross sectional view V of said load bearing member 1 based on echoes received from the load bearing member 1. Alternatively, or in addition to creation of a view as described above, an echo strength graph G can be created based on echoes E,E',E" received from the load bearing member 1, the echo strength graph G presenting echo strength versus thickness directional position of the composite member 1. In this case, the echo strength graph(s) G created are analyzed. Such a graph G is illustrated in each of FIGS. 10 and 11 on the left hand side. On the right hand side, the Figures illustrate a parallelly created cross sectional view V of said load bearing member 1. Parallel creation of a cross sectional view V and an echo strength graph G is not necessary. The creation of the echo strength graph G is performed by a computer or equivalent, which computer or equivalent is either integral with the scanner or connected thereto via a data exchange bus.

An advantage of creation of an echo strength graph G is that it allows use of a simple ultrasound scanning equipment, yet the graph enables simple and quick analysis to detect abnormalities in the echoes registered from the load bearing member 1 being inspected. The echo strength graph G is simple to create, and as it presents echo strength versus thickness directional position of the composite member 1, it efficiently shows which locations of the load bearing member 1, and to what degree, reflect the ultrasound emitted into the load bearing member 1, and also how the ultrasound signal is attenuated within the load bearing member. The echo strength graph G can be a so called A-scan.

Figure 10:
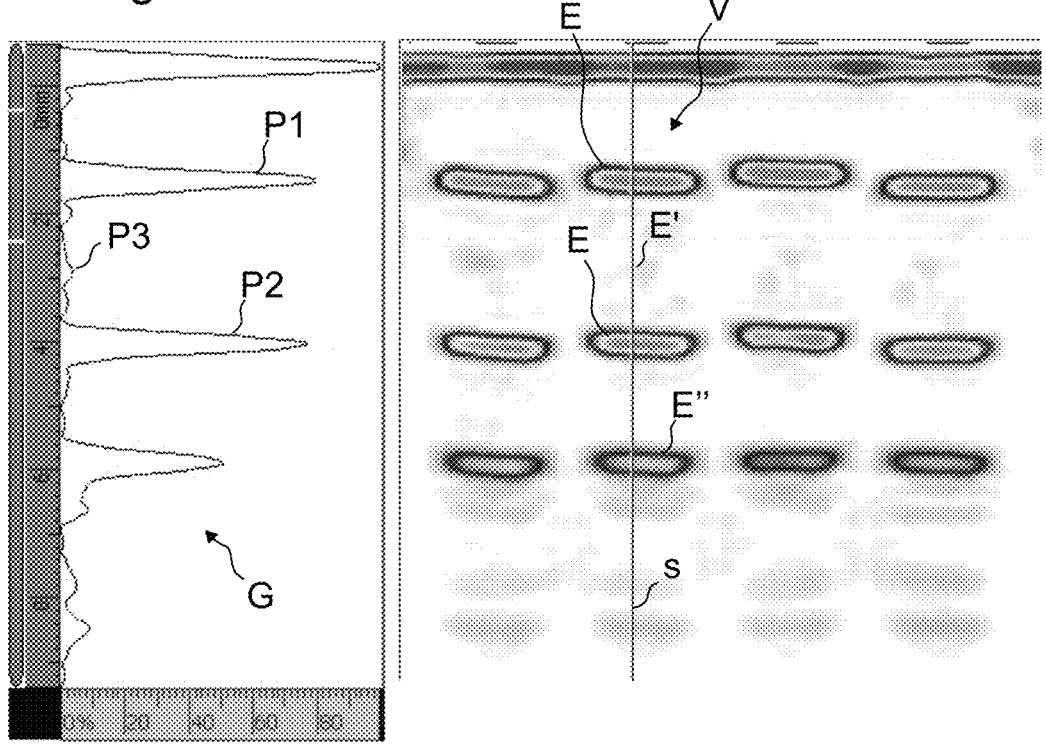
FIG. 10 an example of an echo strength graph created by an ultrasound scanner and indicating no defects.
Figure 11:
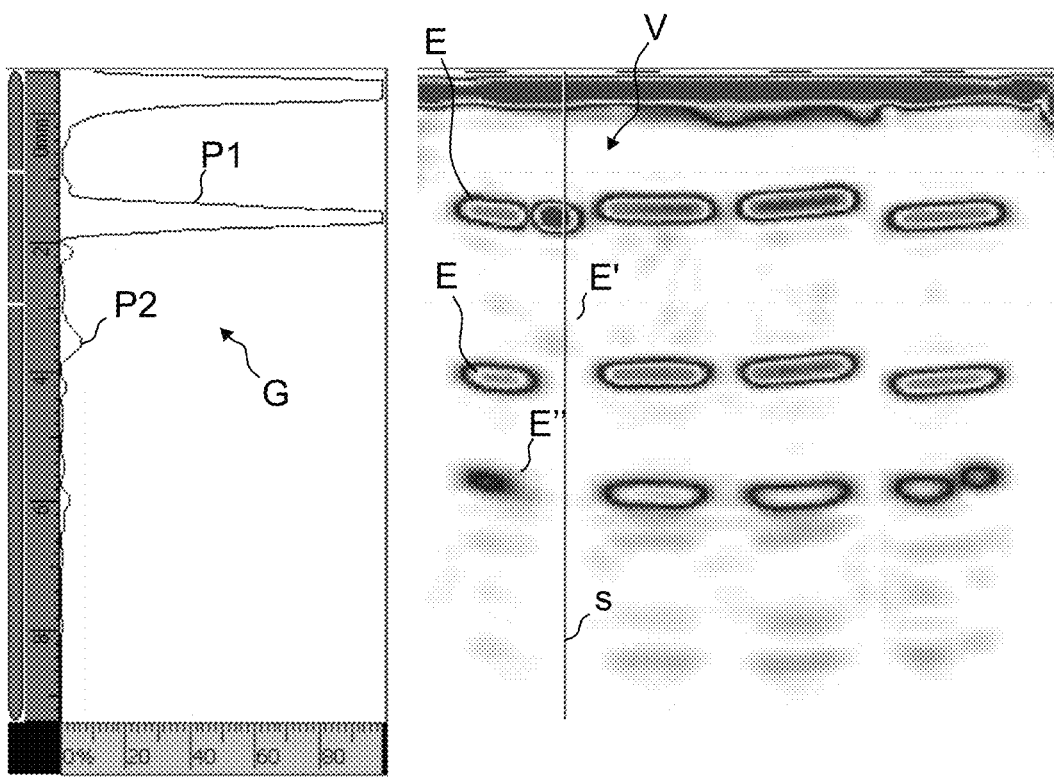
FIG. 11 an example of an echo strength graph created by an ultrasound scanner and indicating defects.

As illustrated in FIGS. 10 and 11, it is preferred that the echo strength graph G presents echo strength versus thickness directional position of the load bearing member 1 as a curve. Generally, it is preferred that the echo strength graph G presents echo strength versus thickness directional position of the composite member as a curve, a line graph, a histogram, a bar chart, or equivalent.

In the examples of FIGS. 10 and 11, the echo strength graph G shows echo strength versus thickness directional position of the composite member 1 only for a cross-sectional slice of the load bearing member 1, wherein the cross-sectional slice extends in scanning direction, which is the thickness direction t of the load bearing member 1 in the presented case. Line s illustrates the aforementioned cross-sectional slice in FIGS. 10 and 11.

FIG. 10 illustrates an example of an echo strength graph G created by an ultrasound scanner of an intact load bearing member 1, without indication of defects. The graph G shows high peaks P1,P2 at the positions of the outer surfaces of the load bearing member 1, i.e. the front and back surfaces of the load bearing member 1. These peaks indicate strength of echoes E received from the outer surfaces of the load bearing member 1. The graph G also shows a low peak P3 at the positions of the back surface of the rope 3, as this particular graph has been created during inspection of a rope 3 comprising a coating 4. In FIG. 10, no substantial amount of echoes have been received from the centermost third of the cross-sectional area of the load bearing member 1, as measured in direction of said scanning, which is here the thickness-direction of the load bearing member 1. Should echoes be received from this part of load bearing member 1, it would be registered and visible in the graph as a substantially higher peak P3 between the peaks P1 and P2, than the peak P3 of FIG. 10. This would also have the effect that peak P2 would be lower.

FIG. 11 illustrates an example of an echo strength graph G created by an ultrasound scanner particularly in a case wherein the strength graph G indicates presence of a defect. The graph G of FIG. 11 shows a high peak P1 at the position of the outer front surface of the load bearing member 1, but only a very low peak P2 at the position of the outer back surface of the load bearing member 1, indicating that only a low amount of echoes E have been received from the back surface of the load bearing member 1. This abnormality is in the presented case due to that a coating 4 covering the load bearing member 1 is partially debonded from the load bearing member 1, an air gap being formed between the load bearing member 1 and the coating 4. This local detachment between the load bearing member 1 and the coating 4 has caused a substantial decrease of amplitude of peak P2, as well as an increase in amplitude of peak P1. The abnormally low peak P2 is visible in the echo strength graph G created from the region covered by the coating 4. The air gap between the coating 4 and the load bearing member 1 has increased the acoustic impedance and has this two-fold effect on the measured signal. The majority of the energy has been reflected and transmission is very low. It is advantageous that even though the load bearing member 1 may in this case be intact, the graph G can reveal defects at the interface of the load bearing member 1 and the coating 4.

The graph G is preferably created in a coordinate system, such as a Cartesian coordinate system, one axis presenting the echo strength and another axis presenting a thickness directional position of the load bearing member, as illustrated. The units of the echo strength and thickness directional position of the load bearing member can be chosen suitably.

The ultrasonic probe frequency is preferably within the range of 0.5 MHz to 200 MHz. Technically, the range of ultrasound can be from 20 kHz up to GHz, but for this application a practical range is 0.5 MHz to 200 MHz.

The echo strength graph G can be analyzed to track changes in attenuation due to fatigue of the composite load bearing members. Fatigue loading of the load bearing members causes microstructural changes which increase the dispersion of sound energy and reduces the strength of the received signal. This effect is known as attenuation and is seen as a decrease in amplitude of the back wall echo.

For enabling creation of the echo strength graph G the method comprises determining echo strength versus thickness directional position of the composite member 1 based on echoes E,E',E" received from the load bearing member 1. This determination is performed by a computer or equivalent, which computer or equivalent is either integral with the scanner or connected thereto via a data exchange bus. Said determining can for example comprise determining intensity of the ultrasound received (J/s/cm2=W/cm2) or relative intensity (dB=10 log 10(1/1_0)). The graph G is then preferably created to present the echo strength with unit dB, J/s/cm2, W/cm2 or % (percentage of change of intensity or relative intensity). In the examples of FIGS. 10 and 11, the unit is % presenting the percentage of change of intensity. The unit of the thickness directional position of the load bearing member 1 can be millimeters, for example. These are the preferred units, the invention however not being limited to them.

In order to identify damages or flaws of the load bearing member, it is preferable that the method comprises detecting echoes E' from within the load bearing member 1, and triggering one or more predefined actions if echoes are detected from within the load bearing member 1 that fulfill predetermined criteria, such as exceed a predetermined threshold. Said echoes E' from within the load bearing member 1 being detected are preferably particularly echoes from the core portion of the load bearing member 1, the core portion being the centermost third of the cross-sectional area of the load bearing member 1, as measured in direction of said scanning, i.e. in cross-direction of the load bearing member 1 which is the thickness direction t in the FIGS. 10 and 11.

As mentioned, the echo strength graph G can be created using a simple ultrasound scanner 2, even an ultrasound scanner using a single element or two element transducer, which would be difficult to achieve when aiming to create cross-sectional views V as described. The ultrasound scanner can, however, comprise any number of elements, beginning with a single element. These elements can also have varying geometries including, but not limited to, circular, square, rectangular, etc.

The analysis of the graph G can comprise detecting amplitudes of one or more peaks of the graph G and comparing the amplitudes of one or more peaks of the graph G with one or more references, and triggering one or more predefined actions if the amplitudes of one or more peaks of the graph G meet one or more predetermined criteria. More specifically, the analysis can comprise one or more of the following:

Detecting amplitude of a peak P1 of the graph G located at a position of the graph showing strength of echoes received from the outer front surface of the load bearing member 1, and triggering one or more predefined actions if the amplitude of the peak P1 is too high or too low, i.e. exceeds a predetermined reference or is lower than a predetermined reference.

Detecting amplitude of a peak P2 of the graph G located at a position of the graph showing strength of echoes received from the back predefined actions if the amplitude of the peak P2 is too high or too low, i.e. exceeds a predetermined reference or is lower than a predetermined reference.

Detecting amplitude of a peak P3 of the graph G located at a position of the graph showing strength of echoes received from core portion of the load bearing member 1, and triggering one or more predefined actions if the amplitude of the peak is too high, i.e. exceeds a predetermined reference. Thereby, it is possible to implement the detection of echoes E' from within the load bearing member 1, and to react to them.

Preferred aspects of the embodiment of FIGS. 3 and 4 are further described hereinafter. The rope 3 is belt-shaped provides that it is substantially larger in its width direction w than in its thickness direction t. The width/thickness ratio of the rope 3 is preferably at least 2 more preferably at least 4, or even more. In this way a large cross-sectional area for the rope 3 is achieved, while the bending capacity around the width-directional axis is still feasible also with rigid materials of the load bearing member, such as composite materials described elsewhere in the application. Thereby, the rope 3 suits very well to be used in hoisting appliances, in particular in elevators, wherein the rope 3 needs to be guided around rope wheels. Also, it is preferable that the load bearing members 1 are wide. Accordingly, each of said one or more load bearing members 1 is preferably larger in width direction w than in thickness direction t of the rope 1. Particularly, the width/thickness ratio of each of said one or more load bearing members is preferably more than 2. Thereby, the bending resistance of the rope 3 is small but the load bearing total cross sectional area is vast with minimal non-bearing areas. The rope 3 being belt-shaped provides that it is turned around the rope wheels of the elevator always around a width directional axis. This increases the likelihood of delamination being formed inside the load bearing members, the fracture then being particularly likely to extend in width direction of the rope/load bearing member 1 as illustrated in FIG. 6. This is particularly relevant to be detected when the load bearing member 1 is made of composite material as described elsewhere in the application, where the structure is relatively homogenous and continues substantially uniformly without twist, because each of these increase risk of formation of long delamination fractures. It is advantageous that the rope 3 is belt-shaped because thus the scanning direction can be simply ensured to be the same for each region A,B,C to be scanned. The belt-shaped elevator rope 3 has opposite wide side faces S1,S2 facing in thickness direction t of the rope 3. The scanning is performed particularly from a lateral side of the load bearing member 1 in thickness direction t of the rope 3. Accordingly, the ultrasound is emitted into the load bearing member(s) 1 through a wide side face S1 of the rope 3 that faces in thickness direction t of the rope 3. Thus, the load bearing member(s) can be inspected in a direction in which delamination fractures are most likely detectable.

Figure 7:
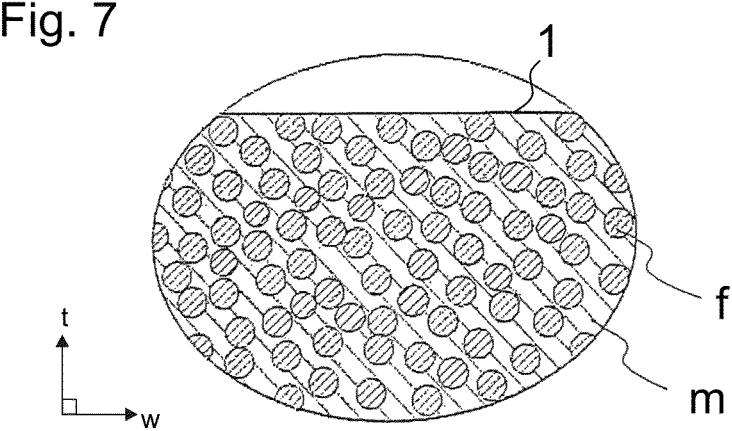
FIGS. 7 and 8 illustrate preferred details of the load bearing member of the rope.
Figure 8:
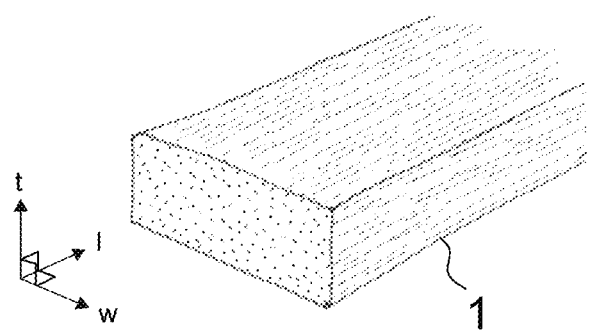

FIG. 7 illustrates a preferred inner structure for said load bearing member 1, showing inside the circle an enlarged view of the cross section of the load bearing member 1 close to the surface thereof, as viewed in the longitudinal direction 1 of the load bearing member 1. The parts of the load bearing member 1 not showed in FIG. 7 have a similar structure. FIG. 8 illustrates the load bearing member 1 three dimensionally. The load bearing member 1 is made of composite material comprising reinforcing fibers f embedded in polymer matrix m. The reinforcing fibers f being in the polymer matrix means here that the individual reinforcing fibers f are bound to each other with a polymer matrix m. This has been done e.g. in the manufacturing phase by immersing them together in the fluid material of the polymer matrix which is thereafter solidified. The reinforcing fibers f are distributed substantially evenly in polymer matrix m and bound to each other by the polymer matrix m. The load bearing member 1 formed is a solid elongated rod-like one-piece structure. Said reinforcing fibers f are most preferably carbon fibers, but alternatively they can be glass fibers, or possibly some other fibers. Preferably, substantially all the reinforcing fibers f of each load bearing member 1 are parallel with the longitudinal direction of the load bearing member 1. Thereby, the fibers f are also parallel with the longitudinal direction of the rope 3 as each load bearing member 1 are to be oriented parallel with the longitudinal direction of the rope 3. This is advantageous for the rigidity as well as behavior in bending. Owing to the parallel structure, the fibers in the rope 3 will be aligned with the force when the rope 3 is pulled, which ensures that the structure provides high tensile stiffness. The fibers f used in the preferred embodiments are accordingly substantially untwisted in relation to each other, which provides them said orientation parallel with the longitudinal direction of the rope 3. This is in contrast to the conventionally twisted elevator ropes, where the wires or fibers are strongly twisted and have normally a twisting angle from 15 up to 40 degrees, the fiber/wire bundles of these conventionally twisted elevator ropes thereby having the potential for transforming towards a straighter configuration under tension, which provides these ropes a high elongation under tension as well as leads to an unintegral structure. The reinforcing fibers f are preferably long continuous fibers in the longitudinal direction of the load bearing member 1, preferably continuing for the whole length of the load bearing member 1.

As mentioned, the reinforcing fibers f are preferably distributed in the aforementioned load bearing member 1 substantially evenly. The fibers f are then arranged so that the load bearing member 1 would be as homogeneous as possible in the transverse direction thereof. An advantage of the structure presented is that the matrix m surrounding the reinforcing fibers f keeps the interpositioning of the reinforcing fibers f substantially unchanged. It equalizes with its slight elasticity the distribution of force exerted on the fibers, reduces fiber-fiber contacts and internal wear of the rope, thus improving the service life of the rope 3. Owing to the even distribution, the fiber density in the cross-section of the load bearing member 1 is substantially constant. The composite matrix m, into which the individual fibers f are distributed, is most preferably made of epoxy, which has good adhesiveness to the reinforcement fibers f and which is known to behave advantageously with reinforcing fibers such as carbon fiber particularly. Alternatively, e.g. polyester or vinyl ester can be used, but any other suitable alternative materials can be used.

The matrix m has been applied on the fibers f such that a chemical bond exists between each individual reinforcing fiber f and the matrix m. Thereby a uniform structure is achieved. To improve the chemical adhesion of the reinforcing fiber to the matrix m, in particular to strengthen the chemical bond between the reinforcing fiber f and the matrix m, each fiber can have a thin coating, e.g. a primer (not presented) on the actual fiber structure between the reinforcing fiber structure and the polymer matrix m. However, this kind of thin coating is not necessary. The properties of the polymer matrix m can also be optimized as it is common in polymer technology. For example, the matrix m can comprise a base polymer material (e.g. epoxy) as well as additives, which fine-tune the properties of the base polymer such that the properties of the matrix are optimized. The polymer matrix m is preferably of a hard non-elastomer, such as said epoxy, as in this case a risk of buckling can be reduced for instance. However, the polymer matrix need not be non-elastomer necessarily, e.g. if the downsides of this kind of material are deemed acceptable or irrelevant for the intended use. In that case, the polymer matrix m can be made of elastomer material such as polyurethane or rubber for instance.

The reinforcing fibers f together with the matrix m form a uniform load bearing member, inside which no substantial abrasive relative movement occurs when the rope is bent. The individual reinforcing fibers f of the load bearing member 1 are mainly surrounded with polymer matrix m, but random fiber-fiber contacts can occur because controlling the position of the fibers in relation to each other in their simultaneous impregnation with polymer is difficult, and on the other hand, elimination of random fiber-fiber contacts is not necessary from the viewpoint of the functioning of the solution. If, however, it is desired to reduce their random occurrence, the individual reinforcing fibers f can be pre-coated with material of the matrix m such that a coating of polymer material of said matrix is around each of them already before they are brought and bound together with the matrix material, e.g. before they are immersed in the fluid matrix material.

As above mentioned, the matrix m of the load bearing member 1 is most preferably hard in its material properties. A hard matrix m helps to support the reinforcing fibers f, especially when the rope bends, preventing buckling of the reinforcing fibers f of the bent rope, because the hard material supports the fibers f efficiently. To reduce the buckling and to facilitate a small bending radius of the load bearing member 1, among other things, it is therefore preferred that the polymer matrix m is hard, and in particular non-elastomeric. The most preferred materials for the matrix are epoxy resin, polyester, phenolic plastic or vinyl ester. The polymer matrix m is preferably so hard that its module of elasticity (E) is over 2 GPa, most preferably over 2.5 GPa. In this case the module of elasticity E is preferably in the range 2.5-10 GPa, most preferably in the range 2.5-4.5 GPa. There are commercially available various material alternatives for the matrix m which can provide these material properties. Preferably over 50% proportion of the surface area of the cross-section of the load bearing member 1 is of the aforementioned reinforcing fiber, preferably such that 50%-80% proportion is of the aforementioned reinforcing fiber, more preferably such that 55%-70% proportion is of the aforementioned reinforcing fiber, and substantially all the remaining surface area is of polymer matrix m. Most preferably, this is carried out such that approx. 60% of the surface area is of reinforcing fiber and approx. 40% is of matrix material (preferably epoxy material). In this way a good longitudinal stiffness for the load bearing member 1 is achieved. As mentioned carbon fiber is the most preferred fiber to be used as said reinforcing fiber due to its excellent properties in hoisting appliances, particularly in elevators. However, this is not necessary as alternative fibers could be used, such as glass fiber, which has been found to be suitable for the hoisting ropes as well. The load bearing member 1 is preferably completely non-metallic, i.e. made not to comprise metal.

Figure 9:
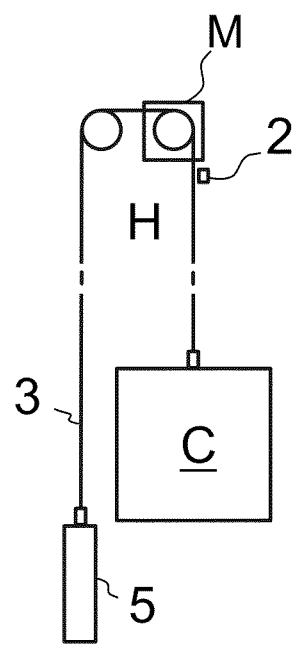
FIG. 9 illustrates preferred details an elevator arrangement wherein the method is implemented.

FIG. 9 illustrates preferred further details of an elevator arrangement wherein the method comprising said inspection is implemented. The elevator comprises a hoistway H and said elevator car C and said counterweight 5 vertically movable in the hoistway H. The elevator comprises one or more ropes 3 that pass around one or more rope wheels mounted in proximity of the upper end of the hoistway H. Said one or more rope wheels can be mounted inside the upper end of the hoistway H, but alternatively it could be mounted inside a space beside or above the upper end of the hoistway H, for example. Said space can form a machine room of the elevator, for instance. Preferably, said one or more rope wheels include a drive wheel rotated by a motor M for thereby moving the elevator car C. There are of course also other alternative ways to provide the motive force to the car C. The elevator preferably comprises a control unit for automatically controlling rotation of the motor, whereby the movement of the car C is also made automatically controllable.

In this implementation, the method is performed on an elongated load bearing member 1 comprised in a rope that is a suspension rope of an elevator for suspending an elevator car C. Thereby, the earlier described method for inspecting condition of an elongated load bearing member 1 of a rope forms part of a method of inspecting condition of a rope. In this case, the embodiment of FIGS. 3 and 4 is particularly to be followed.

The rope 3 the load bearing member 1 of which is inspected is connected to the elevator car C and suspends this during the ultrasound scanning. The scanner can be moved in the hoistway for achieving the relative movement already mentioned earlier above. However, alternatively, the scanner can be mounted on a fixed location at least for the time of the method, such as close to a rope wheel around which the rope 3 that comprises the load bearing member(s) 1 to be inspected passes. The preferred position is illustrated in FIG. 9. In this case, the relative movement is produced by driving the elevator car C at a speed slower than the nominal speed of the elevator, e.g. slower than 2 m/s. This is particularly advantageous as in this way the operator can monitor the process and perform additional inspection in case the scanner produces an alert. For facilitating said monitoring, said fixed location is preferably inside the aforementioned space beside or above the upper end of the hoistway H, such as a machine room.

In the preferred embodiments, an advantageous structure for the load bearing member 1 and the rope 3 has been disclosed. However, the invention can be utilized with also other kind of the load bearing members and the ropes such as with those having different materials and/or shapes.

The methods presented are advantageous for several reasons and they can be used to obtain one or more advantages mentioned in the application. The methods can for instance be used to reveal the location and the kind of damage of a load bearing member very accurately. The methods can be used for catching manufacturing errors, to monitor quality within or at the end of the rope production line. The methods can be used to evaluate possible rope component damage before elevator installation (if, for example, rope has been damaged during transport and damage is seen visually). The methods can be also used to evaluate rope condition during regular maintenance of an elevator.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A method for inspecting a condition of an elongated load bearing member of a rope of a hoisting apparatus, the method comprising:
   ultrasound scanning one or more regions of the load bearing member with an ultrasonic scanner;
   detecting echoes from within the load bearing member; and
   analyzing the shape of the detected echoes to determine the condition of the load bearing member.

2. The method according to claim 1, wherein the ultrasound scanning one or more regions of the load bearing member includes ultrasound scanning a plurality, of regions of the load bearing member located along a length of the load bearing member.

3. The method according to claim 1, wherein said ultrasound scanning is performed from a lateral side of the load bearing member.

4. The method according to claim 1, wherein the ultrasound scanning comprises moving said ultrasonic scanner and said load bearing member relative to each other such that the ultrasonic scanner lies at least momentarily beside each region at a distance within the scanning range of the scanner.

5. The method according to claim 1, wherein said ultrasound scanning further comprises creating from each region a cross sectional view of the load bearing member based on echoes received from the load bearing member, and
   wherein the method further comprises analyzing each cross sectional view.

6. The method according to claim 1, wherein said ultrasound scanning comprises creating from each region an echo strength graph based on echoes received from the load bearing member, the echo strength graph presenting echo strength versus thickness directional position of the load bearing member, and
   wherein the method further comprises analyzing the echo strength graph.

7. The method according to claim 1, further comprising triggering one or more predefined actions if the detected echoes fulfill one or more predetermined criteria.

8. The method according to claim 7, wherein said echoes are from a core portion of the load bearing member, the core portion being the centermost third of the cross-sectional area of the load bearing member.

9. A method for inspecting a condition of an elongated load bearing member of a rope of a hoisting apparatus, the method comprising:
- ultrasound scanning one or more regions of the load bearing member with an ultrasonic scanner;
- detecting, by a data processing device, echoes from within the load bearing member; and
- triggering, by the data processing device, one or more predefined actions if echoes are detected from within the load bearing member that fulfill one or more predetermined criteria,
- wherein said one or more predefined actions includes at least an alarm.

10. A method for inspecting a condition of an elongated load bearing member of a rope of a hoisting apparatus, the method comprising:
- ultrasound scanning one or more regions of the load bearing member with an ultrasonic scanner;
- creating from each region a cross sectional view of the load bearing member based on echoes received from the load bearing member;
- analyzing each cross sectional view; and
- detecting deviations between the cross-sectional views.

11. The method according to claim 1, wherein the load bearing member is completely non-metallic.

12. The method according to claim 1, wherein the load bearing member is made of composite material comprising reinforcing fibers embedded in polymer matrix, said reinforcing fibers being carbon fibers or glass fibers.

13. The method according to claim 1, wherein said load bearing member is comprised in a rope and extends parallel with the longitudinal direction of the rope unbroken throughout the length of the rope.

14. The method according to claim 1, wherein said load bearing member is comprised in a rope, which is connected to the elevator car and suspends the elevator car.

15. The method according to claim 1, wherein said load bearing member is embedded in a coating forming the outer surface of a rope and said ultrasound scanning is performed through the coating.

16. The method according to claim 1, wherein the rope is belt-shaped, and the ultrasound is emitted into the load bearing member through a wide side face of the rope that faces in thickness direction of the rope.

17. The method according to claim 7, wherein the rope is belt-shaped, and said one or more predetermined criteria include that the echoes detected from within the load bearing member form an elongated and substantially linear shape extending in width direction of the rope.

18. The method according to claim 1, wherein the ultrasound frequency is within the range of 0.5 MHZ to 200 MHz.

* * * * *